(12) United States Patent
Kimura

(10) Patent No.: US 8,179,880 B2
(45) Date of Patent: May 15, 2012

(54) WIRELESS COMMUNICATION METHOD AND WIRELESS COMMUNICATION SYSTEM

(75) Inventor: Tohru Kimura, Tokyo (JP)

(73) Assignee: NEC Corporation, Tokyo (JP)

( * ) Notice: Subject to any disclaimer, the term of this patent is extended or adjusted under 35 U.S.C. 154(b) by 953 days.

(21) Appl. No.: 12/096,250

(22) PCT Filed: Dec. 5, 2006

(86) PCT No.: PCT/JP2006/324219
§ 371 (c)(1), (2), (4) Date: Jun. 5, 2008

(87) PCT Pub. No.: WO2007/066637
PCT Pub. Date: Jun. 14, 2007

(65) Prior Publication Data
US 2009/0168747 A1     Jul. 2, 2009

(30) Foreign Application Priority Data
Dec. 5, 2005 (JP) ................... 2005-350875

(51) Int. Cl.
*H04J 3/06* (2006.01)

(52) U.S. Cl. ............... 370/350; 370/503; 370/509

(58) Field of Classification Search ............ 370/310, 370/312, 345, 350, 315, 316, 319, 321, 324, 370/464, 498, 503, 509, 510, 512
See application file for complete search history.

(56) References Cited

U.S. PATENT DOCUMENTS

| 2006/0072694 | A1* | 4/2006 | Dai et al. ............ 375/354 |
| 2006/0106963 | A1* | 5/2006 | Sasaki et al. .......... 710/110 |
| 2008/0165761 | A1* | 7/2008 | Goppner et al. ........ 370/350 |

FOREIGN PATENT DOCUMENTS

| JP | 09-139708 A | 5/1997 |
| JP | 10-327101 A | 12/1998 |
| JP | 2000-101578 A | 4/2000 |
| JP | 2001-285345 A | 10/2001 |
| JP | 2004-208074 A | 7/2004 |
| JP | 2004-343534 A | 12/2004 |
| JP | 2005-110096 A | 4/2005 |
| JP | 2005-217548 A | 8/2005 |
| JP | 2005-269369 A | 9/2005 |
| JP | 2005269369 A * | 9/2005 |

OTHER PUBLICATIONS

"Wireless Medium Access Control (MAC) and Physical Layer (PHY) Specifications for Low-Rate Wireless Personal Area Networks (LR-WPANs)"; IEEE Computer Society, 804.15.4, Part 15.4; Oct. 1, 2003; The Institute of Electrical and Electronics Engineers, Inc.; pp. 1-670.

\* cited by examiner

*Primary Examiner* — Chi Pham
*Assistant Examiner* — Weibin Huang
(74) *Attorney, Agent, or Firm* — Sughrue Mion, PLLC

(57) ABSTRACT

A time synchronizing signal for synchronizing the times of wireless nodes capable of wireless communication is transmitted to the wireless nodes by multihop. Optional information is transferred by multihop from a predetermined wireless node to an optional node along the same path as the transfer path of the time synchronizing signal by the wireless nodes. Information to respond the optional information is transferred by multihop from the optional wireless node to the predetermined wireless node along the reverse path to the transfer path of the time synchronizing signal.

10 Claims, 5 Drawing Sheets

WIRELESS COMMUNICATION METHOD AND WIRELESS COMMUNICATION SYSTEM

TECHNICAL FIELD

The present invention relates to a wireless communication method and system preferably applicable to a ubiquitous sensor network.

BACKGROUND ART

With the recent progress of semiconductor microelectronics, a large number of less expensive wireless communication devices have been constantly provided, and equipment for wireless communications has been widely used in daily life. The era is approaching in which it will be common for all equipment to be installed with wireless communication devices. The wireless communication device in the era is expected to perform a long time operation using a battery so that it can be used in a place where an infrastructure does not exist, that is, where power cannot be easily supplied. Therefore, a power-saving technique for a wireless communication device is an essential requirement.

A network referred to as a ubiquitous sensor network is intended not only to connect equipments in human's activity area such as various types of equipments for home, but also to connect equipments installed in a place where human cannot live such as a sensor for monitoring a volcano, a desert, a seafloor, etc. Therefore, it is necessary to prepare as many or more wireless communication devices as the equipments installed in home or outdoors, and it is preferable to provide less expensive wireless communication devices.

As a technique of realizing the above-mentioned network, a specification is proposed by, for example, non-patent document 1 (Wireless Medium Access Control (MAC) and Physical Layer (PHY) Specifications for Low-Rate Wireless Personal Area Networks (LR-WPANs) (FIG. 1.), IEEE Computer Society, 804.15.4, Part 15.4). In FIG. 1 of the non-patent document 1, a network is configured by a plurality of equipment units including a wireless communication device, and the data acquired by each equipment unit is transmitted to a server device (PAN coordinator).

Japanese Patent Laid-Open No. 2000-101578 (FIG. 1, FIG. 8) shows a primitive example of a ubiquitous sensor network system in which the operating status of each equipment unit is transmitted to external communication means from a wireless communication device installed in each equipment unit such as a room temperature sensor, an air-conditioner and a hot-water supply system, etc., and the external communication means transfers information about the operational status of each equipment unit to an external communication circuit.

Most of the power supplied to a wireless communication device is used by a radio wave transmitting/receiving unit. A receiving unit is a circuit block for receiving a radio signal having a small voltage amplitude of about several micro-volt ($\mu$V) through an antenna, retrieving a signal superposed by a carrier wave, and amplifying a voltage to several voltages at which a digital signal can be processed by current semiconductor LSI technology. On the other hand, a transmitting unit is a circuit block for receiving a digital signal or an analog signal to be transmitted, superposing the signal on a carrier wave, and emitting the result in the air through an antenna.

It is necessary for the transmitting unit to perform transmission using a large amount of power to obtain sufficient reception intensity at a reception point although transmitted radio waves are attenuated in a transmission space, that is, to obtain a sufficiently high signal-to-noise ratio (S/N ratio) at a radio wave reception point. Therefore, the average power consumption of the transmitting unit depends on the operation frequency based on the application field of the ubiquitous sensor network, or depends on the requested distance to be traveled by radio waves or on the S/N ratio. On the other hand, it is necessary that the receiving unit be constantly operated to receive radio waves.

Japanese Patent Laid-Open No. 10-327101 (FIG. 3) and Japanese Patent Laid-Open No. 09-139708 (FIG. 17) show examples of determining the intermittent operation timing between the radio base station or the server device for managing the entire wireless communication system and the wireless communication terminal or the wireless node, and of realizing lower power consumption by the transmitting/receiving units of the wireless communication terminal and the wireless node that are powered by a small battery.

In the ubiquitous sensor network, for example, when it is used for monitoring a natural disaster etc., various sensors and a wireless node for transmitting the information acquired by the sensors are scatteringly arranged in a diameter of several kilometers to several hundreds of kilometers, and the information transmitted from each wireless node is collected by a server device etc.

Since radio waves attenuate in proportion to the square of an achieved distance, it is necessary for each wireless node to transmit radio wave using a large amount of power so that the sever device can receive information from each wireless node arranged over a wide area.

Furthermore, in the networks described in patent documents 2 and 3, it is necessary to transmit radio waves using a large amount of power from a radio base station and a server device in order to synchronize time with a wireless communication terminal arranged in the distance of about several kilometers to several hundreds of kilometers. Therefore, the radio base station and the server device consume a large amount of power.

A configuration can include, for example, a radio wave clock in each wireless communication terminal as a method of synchronizing the time of each wireless communication terminal without transmitting information for time synchronization from a radio base station and a server device. However, when a radio wave clock is included, each wireless communication device is considerably costly. Therefore, it is difficult to apply the concept to the ubiquitous sensor network in which several thousands to several tens of thousands of wireless communication devices are used.

When radio waves are transmitted by using a large amount of power from a radio base station, as in the above-mentioned conventional wireless communication system, and when there is a plurality of wireless communication systems in an arbitrary area, there occurs a problem of interference of radio waves transmitted and received in each wireless communication system. For example, if there is a radio base station that belongs to a wireless communication system, and if there is a wireless communication terminal that belongs to another wireless communication system arranged near the radio base station, then the wireless communication terminal will be strongly influenced by radio waves transmitted from the radio base station. Therefore, it is difficult for the terminal to receive radio waves transmitted from the radio base station of the wireless communication system to which the terminal belongs. In this case, to receive the radio waves transmitted from the radio base station of the wireless communication system to which the terminal belongs, it is necessary to provide a high-performance filter circuit or signal processing circuit to amplify received radio waves by a large gain and to detect a desired signal from the amplified signal. As a result, a wireless communication terminal consumes a large amount of power, and a high-performance circuit is required, thereby producing a costly system.

DISCLOSURE OF THE INVENTION

It is an object of the present invention to provide a power-saving and less expensive wireless communication method and system preferably used for a ubiquitous sensor network.

To attain the above-mentioned advantage, a time synchronizing signal is transmitted to each wireless node by multihop to synchronize time among a plurality of wireless nodes in the present invention.

A wireless node includes a wireless transmitting/receiving unit for receiving a time synchronizing signal for synchronization of time among a plurality of wireless nodes, and for transferring the time synchronizing signal to an adjacent wireless node different from a sender of the time synchronizing signal.

With the above-mentioned configuration, each wireless node only has to transmit a time synchronizing signal in each predetermined period to an adjacent wireless node, and only consumes the least possible transmission power for time synchronization. Therefore, unnecessary radio wave radiation can be suppressed while reducing the power consumption of each wireless node, thereby maintaining the signal-to-noise ratio (S/N ratio) of the entire wireless communication system at a high value. In addition, since the power consumption of a wireless node can be considerably reduced, a maintenance-free operation can be realized for several years using a small and low cost battery.

BEST MODE FOR CARRYING OUT THE INVENTION

The present invention is described below with reference to the attached drawings.

Figure 1:
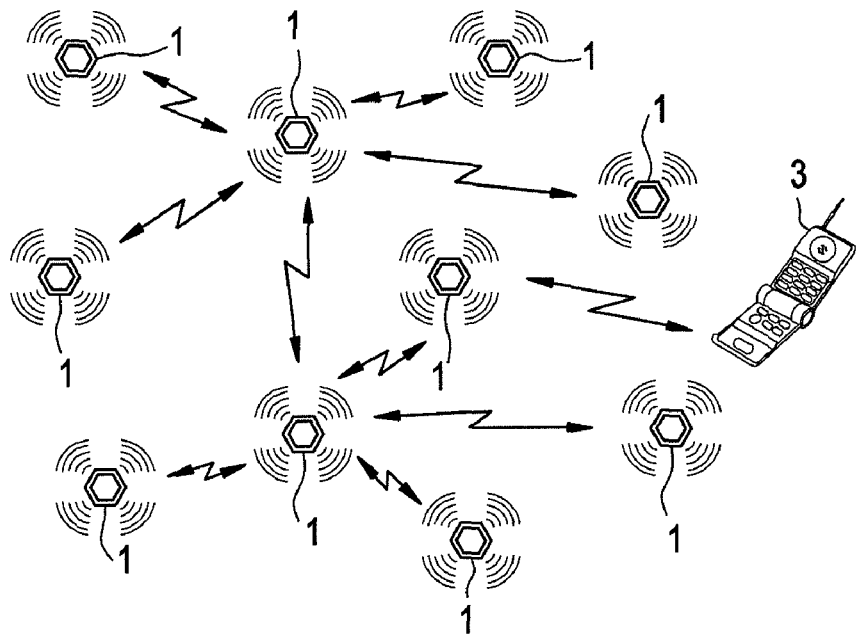
FIG. 1 is a block diagram showing an example of a configuration of the wireless communication system according to the present invention.

As shown in FIG. 1, the wireless communication system according to the present invention includes a plurality of wireless nodes 1 capable of performing wireless communications, and server device 3 for transmitting and receiving information. The configuration shown in FIG. 1 includes 10 wireless nodes 1 and one server device 3, but the number of wireless nodes 1 and server devices 3 are not limited to this application, and any number can be accepted. Although a mobile terminal is exemplified as server device 3 in FIG. 1, server device 3 can be realized in an information processing device such as a personal computer etc. as long as it includes wireless node 1 and a wireless communication device for transmitting and receiving information. Also acceptable is a configuration having wireless node 1 and a radio base station for performing wireless communications in the wireless communication system shown in FIG. 1, and a radio base station relays the communications between wireless node 1 and server device 3. In this case, server device 3 and a radio base station can communicate with each by radio means by cable.

In the above-mentioned ubiquitous sensor network, it is expected that total power consumption of each wireless communication device can be suppressed by intermittently performing communications, thereby realizing a maintenance-free operation for several years using a small battery. To enable wireless communications between devices that perform intermittent operations, it is necessary to synchronize the time of each wireless communication device.

In the wireless communication system according to the present invention, the time synchronizing signal for synchronizing the time of each wireless node 1 is transmitted from server device 3 to each wireless node 1 in each predetermined period. Then, the plurality of wireless nodes 1 and server device 3 configuring the wireless communication system according to the present invention can perform wireless communications only between adjacent wireless nodes 1, between server device 3 and adjacent wireless node 1 or server device 3. Therefore, the time synchronizing signal transmitted from server device 3 is transmitted first to wireless node 1 adjacent to server device 3, and sequentially transmitted from wireless node 1 adjacent to server device 3 to wireless node 1 farthest from server device 3 by another wireless node positioned between them. Simultaneously, a signal including any information such as a command transmitted from server device 3 to any wireless node 1, data, etc. is first transmitted to wireless node 1 adjacent to server device 3, and sequentially transmitted by other wireless nodes between wireless node 1 adjacent to server device 3 and wireless node 1 as a destination.

On the other hand, a signal transmitted from optional wireless node 1 to server device 3 is first transmitted to the adjacent wireless node, and sequentially transmitted by other wireless nodes for relaying to destination server device 3.

That is, the time synchronizing signal is transmitted to all wireless nodes 1 by multihop. The signal transmitted from server device 3 to any wireless node 1 is transmitted to destination wireless node 1 by multihop in the same order as the transfer order of the time synchronizing signal. The signal transmitted from optional wireless node 1 to server device 3 is transmitted by multihop in the inverse order to the transfer order of the time synchronizing signal by a plurality of wireless nodes 1.

In the wireless communication system shown in FIG. 1, various types of information for initialization are transmitted from server device 3 to each wireless node 1 only when a ubiquitous sensor network configured by wireless node 1 and server device 3 is first set, and the network is reproduced by a plurality of wireless nodes 1 and server device 3. When the process of the initialization is completed, each wireless node 1 can perform wireless communications with adjacent wireless node 1 without server device 3.

Figure 2:
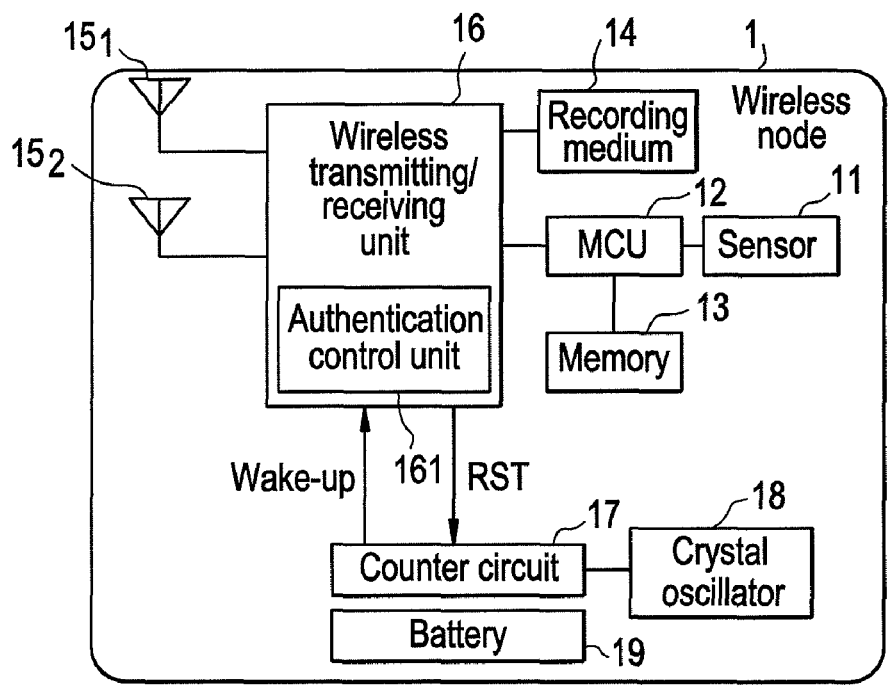
FIG. 2 is a block diagram showing an example of a configuration of the wireless node shown in FIG. 1.

As shown in FIG. 2, wireless node 1 includes sensor 11 for acquiring various types of information, MCU 12 for processing the information acquired by sensor 11, memory 13 for holding various data necessary in the process performed by MCU 12, recording medium 14 for storing various types of information for initialization, a program for operating MCU 12, etc., wireless transmitting/receiving unit 16 for transmitting and receiving various types of information to and from wireless node 1 adjacent through a plurality of antennas 15 (in FIG. 2, antennas $15_1$, and $15_2$) and server device 3, counter circuit 17 for generating a wake-up signal for operation of wireless transmitting/receiving unit 16 in each predetermined period, crystal oscillator 18 for providing a clock for counter circuit 17, and battery 19 for providing power for each device of the wireless node. Recording medium 14 can be a rewritable storage device such as EEPROM, a magnetic recording device, etc.

In wireless node 1 according to the present exemplary embodiment, only crystal oscillator 18 and counter circuit 17 shown in FIG. 2 are constantly operated, and counter circuit 17 outputs a wake-up signal in each predetermined period, thereby activating wireless transmitting/receiving unit 16. Wireless transmitting/receiving unit 16 supplies a reset (RST) signal to counter circuit 17 to synchronize with time synchronizing signal, and counter circuit 17 sets the count value as the initial value by a reset (RST) signal. Therefore, in each wireless node 1, each wireless transmitting/receiving unit 16 is synchronously activated, and operates intermittently.

When wireless transmitting/receiving unit 16 starts an operation according to a wake-up signal, it receives a time synchronizing signal transmitted from server device 3 or from adjacent wireless node 1, outputs the reset (RST) signal to counter circuit 17, and transfers the time synchronizing signal that was received to another adjacent wireless node 1 other than the transmitting device.

Wireless transmitting/receiving unit 16 includes authentication control unit 161 for determining whether or not a received signal is transmitted from wireless node 1 or from server device 3 authorized as a communication partner. Authentication control unit 161 determines whether or not the received signal is transmitted from wireless node 1 or from server device 3 (that is, a device belonging to the same network as the unit) authorized as a communication partner. If the received signal is transmitted from wireless node 1 or server device 3 authorized as a communication partner, then it further determines whether or not the destination of the received signal is the node to which the unit belongs. When the destination of the received signal is the node to which the unit belongs, wireless transmitting/receiving unit 16 allows MCU 12 to perform a predetermined process as necessary based on the command and data included in the received signal, and transmits the signal including a process result to wireless node 1 or server device 3 of the sender through adjacent wireless node 1. If the destination of the received signal is not the node to which the unit belongs, it transfers the signal to the adjacent wireless node to be transmitted to destination wireless node 1.

Figure 3:
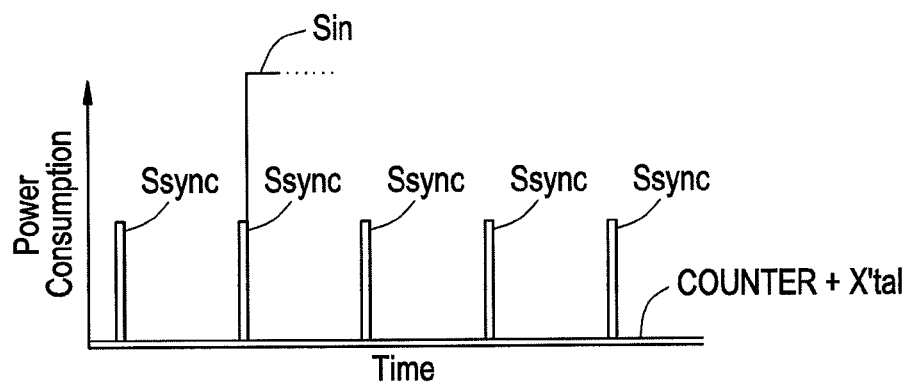
FIG. 3 is a timing chart showing the fluctuation of power consumption of the wireless node shown in FIG. 2.

As shown in FIG. 3, wireless node 1 provided for the wireless communication system of the present invention constantly consumes only the power (COUNTER+X'tal shown in FIG. 3) of crystal oscillator 18 and counter circuit 17 (about several μW), and intermittently consumes power during the process when wireless transmitting/receiving unit 16 transmits and receives the time synchronizing signal in each predetermined period ($S_{sync}$ shown in FIG. 3). Then, only when a signal other than the time synchronizing signal is received ($S_{in}$ shown in FIG. 3), a predetermined process is performed by MCU 12 etc., and a signal including the process result is transmitted from wireless transmitting/receiving unit 16 to wireless node 1 and server device 3 of the sender. At this time, power is consumed depending on the process contents.

Therefore, wireless node 1 normally transmits and receives a time synchronizing signal intermittently, and a communication partner is adjacent wireless node 1. Therefore, the power required for the process can be minimal. As a result, according to the present invention, unnecessary radio wave radiation can be suppressed while reducing the power consumption of each wireless node 1, thereby maintaining the signal-to-noise ratio (S/N ratio) of the entire wireless communication system at a high value. In addition, since the power consumption of wireless node 1 can be considerably reduced, a maintenance-free operation can be realized for several years using a small and low cost battery.

Figure 4:
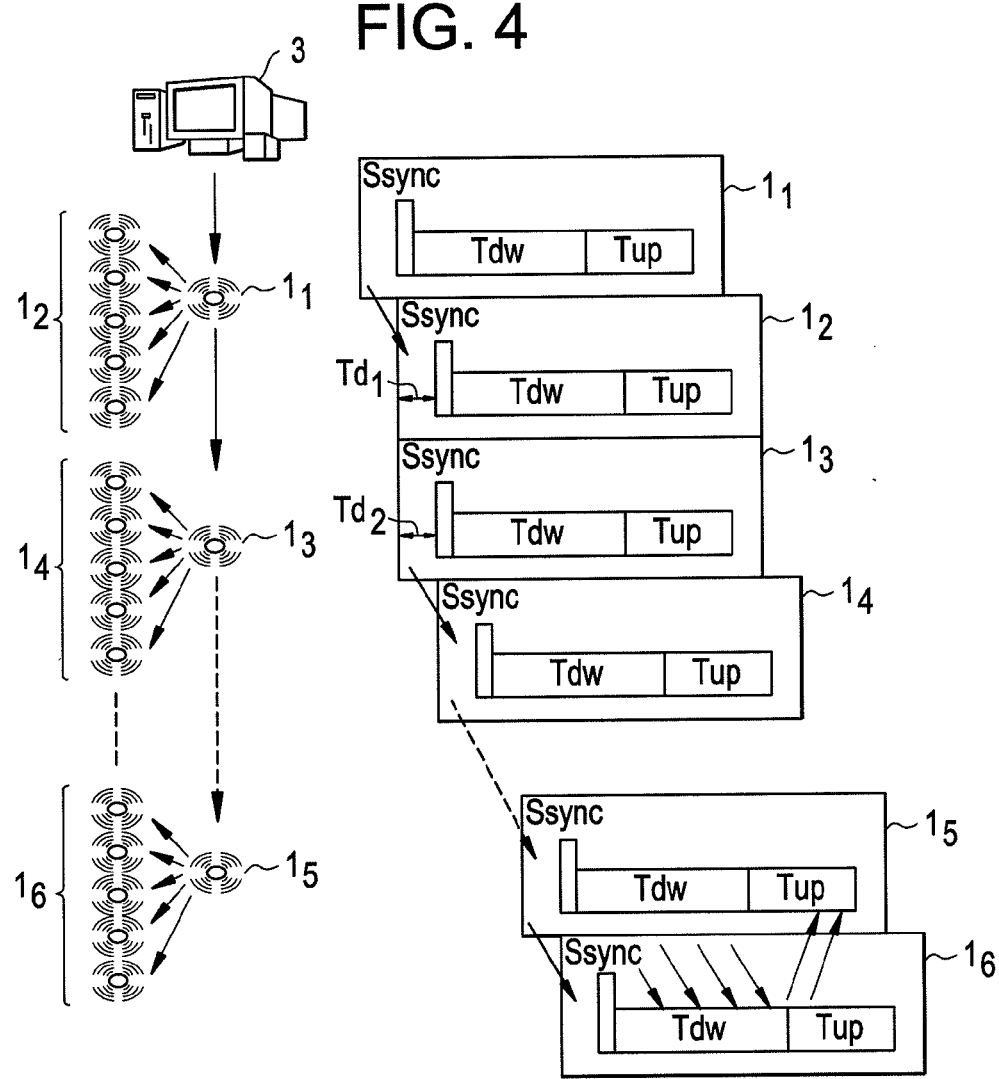
FIG. 4 is a schematic diagram showing an example of a transmitting/receiving operation of the wireless communication system according to the present invention.

FIG. 4 shows an example of a transmitting/receiving operation of the wireless communication system according to the present invention. In FIG. 4, optional signals other than a time synchronizing signal $S_{sync}$ and a time synchronizing signal are transmitted from server device 3, the signals are sequentially transmitted from wireless node $1_1$, closest to server device 3, to wireless node $1_6$ that is farthest from server device 3, and signals in response to the optional signals are sequentially transmitted from the farthest wireless node $1_6$ to server device 3.

As shown in FIG. 4, when server device 3 first transmits a time synchronizing signal $S_{sync}$ in each predetermined period, wireless node $1_1$ adjacent to server device 3 transfers the time synchronizing signal $S_{sync}$ received from server device 3 to adjacent wireless node $1_2$ and wireless node $1_3$. Similarly, wireless node $1_3$ transfers the time synchronizing signal $S_{sync}$ received from wireless node $1_1$ to adjacent wireless node $1_4$ and transfers the time synchronizing signal $S_{sync}$ received from wireless node $1_1$ to wireless node $1_5$. In addition, wireless node $1_5$ transfers the time synchronizing signal $S_{sync}$ received from wireless node $1_3$ to adjacent wireless node $1_6$. In the above-mentioned procedure, the time synchronizing signal $S_{sync}$ is transferred by multihop from server device 3 to the farthest wireless node $1_6$.

Wireless node $1_1$, $1_3$, and $1_5$ shown in FIG. 4 need a processing time for transferring a received signal to another wireless node, thereby causing an error in time synchronization between adjacent wireless nodes.

Assume that the delay time occurring when a time synchronizing signal is transmitted or received between wireless node $1_1$ and wireless node $1_2$ is defined as first delay time Td1, and the delay time occurring when a time synchronizing signal is transmitted or received between wireless node $1_1$ and wireless node $1_3$ is defined as second delay time Td2. Under these conditions, the distances between wireless nodes are not necessarily identical. Therefore, first delay time Td1 is different from second delay time Td2.

However, the difference between first delay time Td1 and second delay time Td2 (|Td1−Td2|) is very small relative to the respective values (Td1 or Td2), and can be ignored. Therefore, to simplify the description, first delay time Td1 is defined as a delay time required by a transfer between wireless nodes. In addition, assume that the time required when a signal other than the time synchronizing signal is transmitted in the direction from server device 3 to wireless node 1 is defined as down link period Tdw, and the period required when a signal other than the time synchronizing signal is transmitted in the direction from wireless node 1 to server device 3 is defined as up link period Tup.

In the down link period Tdw, a signal is transferred by first delay time Td1 as with the time synchronizing signal $S_{sync}$. On the other hand, since a delay occurs when by a signal in the up link period Tup is transmitted, the period in which a signal can be practically transmitted is calculated by subtracting double the time of the first delay time Td1 from the defined up link period Tup. Therefore, in the wireless communication system according to the present invention, the up link period Tdw is set longer than the down link period Tup. Otherwise, the communication speed in the up link period Tup is set higher than the communication speed in the down link period Tdw. Thus, by regulating the length of the period of the up link period Tdw and the down link period Tup or the relation between the communication speed in the up link period Tup and the communication speed in the down link period Tdw, the influence of the error of time synchronization between wireless nodes due to the above-mentioned delay time can be reduced.

First Exemplary Embodiment

Figure 5:
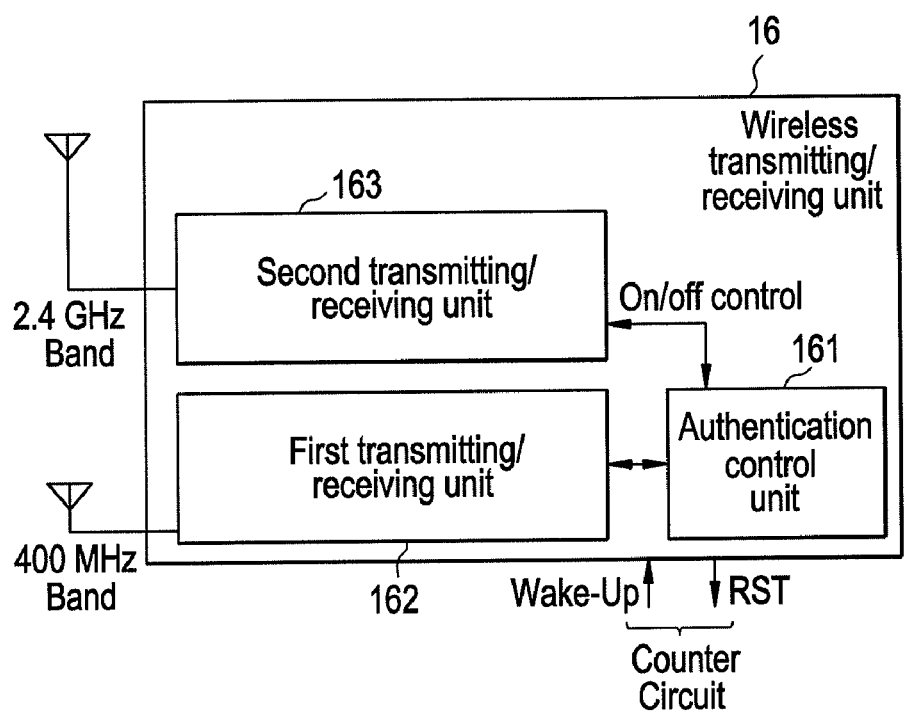
FIG. 5 shows a first exemplary embodiment of the wireless communication system according to the present invention, and is a block diagram showing the configuration of the wireless transmitting/receiving unit of a wireless node.

FIG. 5 shows a first exemplary embodiment of the wireless communication system of the present invention, and is a block diagram of the configuration of the wireless transmitting/receiving unit of a wireless node.

As shown in FIG. 5, according to the present exemplary embodiment, wireless transmitting/receiving unit 16 is provided with two units, that is, first transmitting/receiving unit 162 and second transmitting/receiving unit 163 corresponding to two types of carrier frequency.

As described above, in the present invention, the communication speed in the up link period Tup is set higher than the communication speed in the down link period Tdw. Therefore, in the present exemplary embodiment, first transmitting/receiving unit 162 corresponding to a-relatively low carrier wave (for example, 400 MHz band) is used for communications of the down link period Tdw. In addition, second transmitting/receiving unit 163 corresponding to a relatively high carrier wave (for example, 2.4 GHz band) is used for communications in the up link period Tup. Since a well known configuration can be used for first transmitting/receiving unit 162 and second transmitting/receiving unit 163, a detailed description is omitted here.

According to the Japan Radio Wave Law, when a 2.4 GHz band is used for a carrier wave, communications up to 54 Mbps can be performed, and communications from 2.4 K to 4.8 kbps can be performed when a 400 MHz band is used for a carrier wave. That is, a higher-speed communication can be realized through the utilization of a broader band by using 2.4 GHz band for a carrier wave instead of by using the 400 MHz band for a carrier wave.

Therefore, authentication control unit 161 of wireless transmitting/receiving unit 16 according to the present exemplary embodiment first analyzes a received signal by first transmitting/receiving unit 162 for the 400 MHz band when a signal other than a time synchronizing signal is received, and when it is determined to be a signal transmitted from wireless node 1 authorized as a communication partner, second transmitting/receiving unit 163 for the 2.4 GHz band is activated to transmit a process result etc. by MCU 12.

Generally, the transmitting/receiving unit for a carrier wave frequency exceeding GHz requires larger power consumption than a transmitting/receiving unit for a relatively low carrier wave frequency of MHz band. According to the present exemplary embodiment, since second transmitting/receiving unit 163 that consumes more power operates only when, for example, server device 3 etc. requests a process, the power consumption of wireless node 1 is suppressed. Furthermore, since first transmitting/receiving unit 162 that consumes relatively less power consumption is also used only for the transmission and reception of a time synchronizing signal transmitted in each predetermined period, minimal power consumption can be used.

Figure 6:
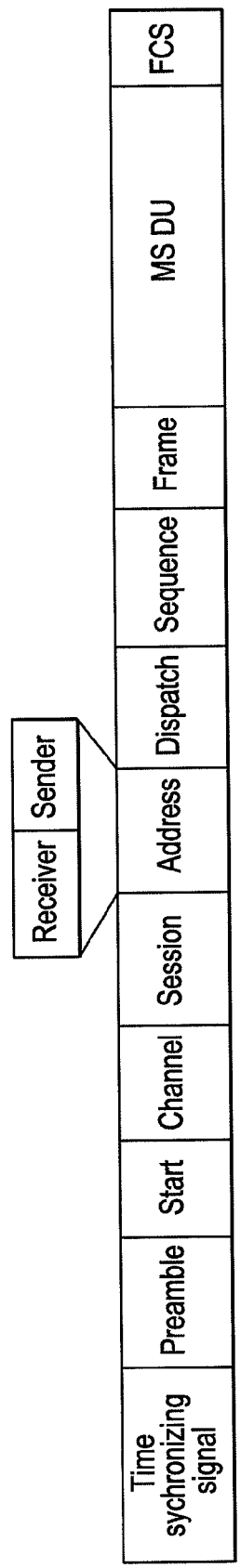
FIG. 6 is a schematic diagram showing an example of a configuration of a packet for use in the wireless communication system according to the present invention.

As shown in FIG. 6, according to the present exemplary embodiment, an identification code (sender/receiver address) of a sender and a receiver (destination) is assigned as a packet for use in transmitting/receiving information.

A communication packet is transmitted and received in order of the time from left side to right side. The wireless communications packet shown in FIG. 6 is configured by a time synchronizing signal, a preamble signal (preamble), a start-of-frame signal (start of frame), a channel specification signal (channel), a session number specification signal (session No.), address[receiver address, sender address]), dispatch control, a sequence number (sequence No.), a frame length, MAC data (MSDU: MAC service data unit), a frame check (FCS: frame check sequence). It is important to include a time synchronizing signal in a communication packet, and any position in a communication packet is allowed.

The configuration of the packet shown in FIG. 6 is an example only, and any information can be included as long as the identification codes of the sender and receiver (destination) are included. Therefore, since the information other than the identification codes of the sender and receiver (destination) is not related to the present invention, a description is omitted here.

By transmitting and receiving the packet, authentication control unit 4 of the wireless transmitting/receiving unit can correctly determine whether or not a received signal has been issued from another wireless node 1 in the network to which the unit belongs or server device 3. Therefore, since a transmitting/receiving unit for the relatively low frequency (for example, 400 MHz band) or a transmitting/receiving unit for the relatively high frequency (for example, 2.4 GHz band) is not erroneously operated, an increase in power consumption is thereby suppressed.

Second Exemplary Embodiment

Figure 7:
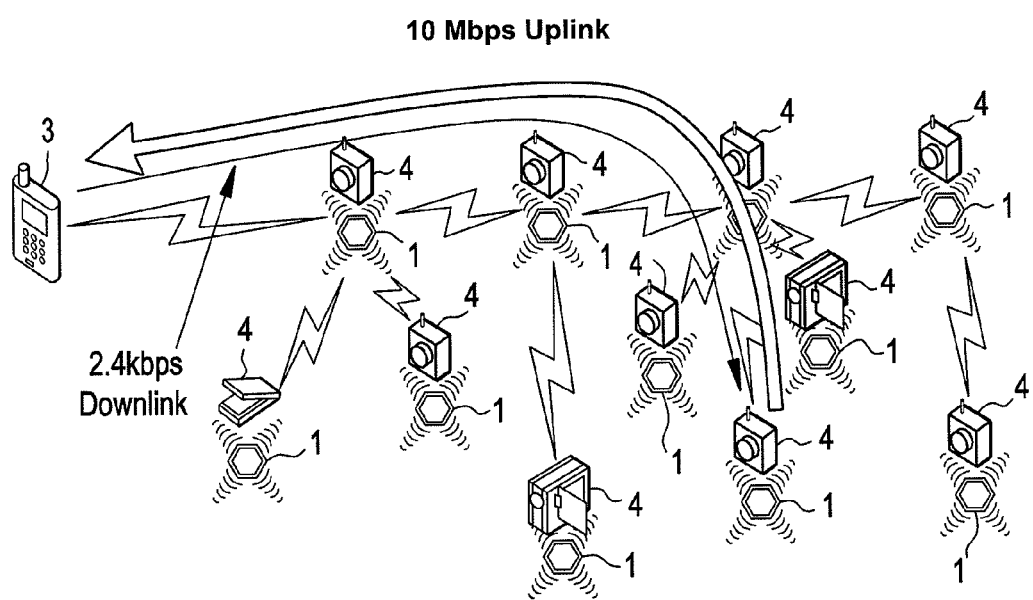
FIG. 7 is a block diagram showing the configuration according to a second exemplary embodiment of the wireless communication system of the present invention.

FIG. 7 is a block diagram of the configuration of the second exemplary embodiment of the wireless communication system of the present invention.

The wireless communication system shown in FIG. 7 shows an example of a ubiquitous sensor network having a plurality of wireless nodes provided with monitor camera 4 as a sensor.

The wireless communication system shown in FIG. 7 is an example of transmitting a transfer instruction of a video signal taken by monitor camera 4 to predetermined wireless node 1 by server device 3, and is an example of transferring to server device 3 a video signal from wireless node 1 specified by server device 3 through a plurality of wireless nodes.

An instruction to transfer a video signal is several byte information, and a video signal is data of several tens to several hundreds of Kbytes. Therefore, the wireless communication system shown in FIG. 7 performs, for example, low speed communications of 2.4 kbps in the down link period Tdw, and high speed communications of 10 Mbps in the up link period Tup.

In the wireless communication method according to the present invention, the ubiquitous sensor network as shown in FIG. 7 can be realized by low power consumption at a low cost. The ubiquitous sensor network shown in FIG. 7 can also be widely applied to a security system for maintaining safe facilities and for monitoring the flow of people entering and exiting a specific place, managing the transportation of products, monitoring a patient in a medical field, etc.

The invention claimed is:

1. A wireless communication method for transmitting and receiving information in a predetermined period by a plurality of wireless nodes capable of performing wireless communications, comprising:

transmitting a time synchronizing signal for synchronizing the time among the plurality of wireless nodes to the plurality of wireless nodes by multihop, wherein optional information from a predetermined wireless node to an optional wireless node is transferred by the multihop through the same path as a transfer path of said time synchronizing signal by the plurality of wireless nodes, and information about the optional information from the optional wireless node to the predetermined wireless node is transferred by said multihop through a path inverse to the transfer path of said time synchronizing signal by the plurality of wireless nodes, and wherein a speed at which information is communicated between said wireless nodes along the path inverse to the transfer path of said time synchronizing signal is adjusted to be higher than a speed at which information is communicated between said wireless nodes along the transfer path of said time synchronizing signal.

2. The wireless communication method according to claim 1, wherein:

said time synchronizing signal includes information for identifying a sender device; and said wireless node allows said time synchronizing signal to be valid when information for identifying said sender device indicates a device belonging to the same network as said wireless node.

3. A wireless communication method for transmitting and receiving information in a predetermined period by a plurality of wireless nodes capable of performing wireless communications, comprising:

transmitting a time synchronizing signal for synchronizing the time among the plurality of wireless nodes to the plurality of wireless nodes by multihop, wherein optional information from a predetermined wireless node to an optional wireless node is transferred by the multihop through the same path as a transfer path of said time synchronizing signal by the plurality of wireless nodes, and information about the optional information from the optional wireless node to the predetermined wireless node is transferred by said multihop through a path inverse to the transfer path of said time synchronizing signal by the plurality of wireless nodes, and wherein a period during which information is communicated between said wireless nodes along the path inverse to the transfer path of said time synchronizing signal is adjusted to be longer than a period during which information is communicated between said wireless nodes along the transfer path of said time synchronizing signal.

4. A wireless communication method for transmitting and receiving information in a predetermined period by a plurality of wireless nodes capable of performing wireless communications, comprising:

transmitting a time synchronizing signal for synchronizing the time among the plurality of wireless nodes to the plurality of wireless nodes by multihop, wherein optional information from a predetermined wireless node to an optional wireless node is transferred by the multihop through the same path as a transfer path of said time synchronizing signal by the plurality of wireless nodes, and information about the optional information from the optional wireless node to the predetermined wireless node is transferred by said multihop through a path inverse to the transfer path of said time synchronizing signal by the plurality of wireless nodes, and wherein a band of a carrier wave for use in communications of the optional information between said wireless nodes along the path inverse to the transfer path of said time synchronizing signal is adjusted to be wider than another band of another carrier wave for use in communications of information between said wireless nodes along the transfer path of said time synchronizing signal.

5. A wireless communication method for transmitting and receiving information in a predetermined period by a plurality of wireless nodes capable of performing wireless communications, comprising:

transmitting a time synchronizing signal for synchronizing the time among the plurality of wireless nodes to the plurality of wireless nodes by multihop, wherein optional information from a predetermined wireless node to an optional wireless node is transferred by the multihop through the same path as a transfer path of said time synchronizing signal by the plurality of wireless nodes, and information about the optional information from the optional wireless node to the predetermined wireless node is transferred by said multihop through a path inverse to the transfer path of said time synchronizing signal by the plurality of wireless nodes, and wherein information transferred through the transfer path of said time synchronizing signal and information transferred through the path inverse to the transfer path of said time synchronizing signal include information for identifying a sender device; and said wireless node allows the information transferred through the transfer path of said time synchronizing signal and the information transferred along the path inverse to the transfer path of said time synchronizing signal to be valid when information for identifying the sender device indicates a device belonging to the same network as said wireless node.

6. A wireless communication system comprising a plurality of wireless nodes capable of transmitting and receiving information in a predetermined period and performing wireless communications, wherein said wireless nodes comprise a wireless transmitting/receiving unit for receiving a time synchronizing signal to synchronize the time among the plurality of wireless nodes and transferring said time synchronizing signal to an adjacent wireless node different from a sender of said time synchronizing signal, wherein when said wireless transmitting/receiving unit receives optional information from the adjacent wireless node, the unit transfers the information to the adjacent wireless node in a same direction as a transfer direction of said time synchronizing signal; and when said wireless transmitting/receiving unit receives information to respond the optional information from the adjacent wireless node, the unit transfers the information to the adjacent wireless node in a direction inverse to the transfer direction of said time synchronizing signal, and wherein said wireless transmitting/receiving unit comprises:

a first transmitting/receiving unit for transmitting and for receiving said time synchronizing signal and said optional information; and a second transmitting/receiving unit for transmitting and receiving the information about said optional information; and a speed at which information is communicated by said second transmitting/receiving unit is higher than a speed at which information is communicated by said first transmitting/receiving unit.

7. The wireless communication system according to claim 6, wherein said wireless transmitting/receiving unit comprises an authentication control unit for allowing a received time synchronizing signal to be valid when information for identifying a sender device included in said time synchronizing signal indicates a device belonging to the same network as the unit.

8. A wireless communication system comprising a plurality of wireless nodes capable of transmitting and receiving information in a predetermined period and performing wireless communications, wherein said wireless nodes comprise a wireless transmitting/receiving unit for receiving a time synchronizing signal to synchronize the time among the plurality of wireless nodes and transferring said time synchronizing signal to an adjacent wireless node different from a sender of said time synchronizing signal, wherein when said wireless transmitting/receiving unit receives optional information from the adjacent wireless node, the unit transfers the information to the adjacent wireless node in a same direction as a transfer direction of said time synchronizing signal; and when said wireless transmitting/receiving unit receives information to respond the optional information from the adjacent wireless node, the unit transfers the information to the adjacent wireless node in a direction inverse to the transfer direction of said time synchronizing signal, and wherein said wireless transmitting/receiving unit comprises:

a first transmitting/receiving unit for transmitting and receiving said time synchronizing signal and the optional information; and a second transmitting/receiving unit for transmitting and receiving the information about said optional information; and a period during which information is communicated by said second transmitting/receiving unit is longer than another period during which information is communicated by said first transmitting/receiving unit.

9. A wireless communication system comprising a plurality of wireless nodes capable of transmitting and receiving information in a predetermined period and performing wireless communications, wherein said wireless nodes comprise a wireless transmitting/receiving unit for receiving a time synchronizing signal to synchronize the time among the plurality of wireless nodes and transferring said time synchronizing signal to an adjacent wireless node different from a sender of said time synchronizing signal, wherein when said wireless transmitting/receiving unit receives optional information from the adjacent wireless node, the unit transfers the information to the adjacent wireless node in a same direction as a transfer direction of said time synchronizing signal; and when said wireless transmitting/receiving unit receives information to respond the optional information from the adjacent wireless node, the unit transfers the information to the adjacent wireless node in a direction inverse to the transfer direction of said time synchronizing signal, wherein said wireless transmitting/receiving unit comprises:

a first transmitting/receiving unit for transmitting and for receiving said time synchronizing signal and said optional information; and a second transmitting/receiving unit for transmitting and receiving the information about said optional information; and wherein a band of a carrier wave used by said second transmitting/receiving unit is wider than another band of another carrier wave used by said first transmitting/receiving unit.

10. A wireless communication system comprising a plurality of wireless nodes capable of transmitting and receiving information in a predetermined period and performing wireless communications, wherein said wireless nodes comprise a wireless transmitting/receiving unit for receiving a time synchronizing signal to synchronize the time among the plurality of wireless nodes and transferring said time synchronizing signal to an adjacent wireless node different from a sender of said time synchronizing signal, wherein when said wireless transmitting/receiving unit receives optional information from the adjacent wireless node, the unit transfers the information to the adjacent wireless node in a same direction as a transfer direction of said time synchronizing signal; and when said wireless transmitting/receiving unit receives information to respond the optional information from the adjacent wireless node, the unit transfers the information to the adjacent wireless node in a direction inverse to the transfer direction of said time synchronizing signal, and wherein said wireless transmitting/receiving unit comprises an authentication control unit for allowing a received time synchronizing signal to be valid when information for identifying a sender device included in information received from the adjacent wireless node indicates a device belonging to the same network as the unit.

* * * * *